United States Patent [19]

Dunwoody

[11] Patent Number: 5,218,997
[45] Date of Patent: Jun. 15, 1993

[54] DIGITAL HYDRAULIC VALVE CONTROL

[75] Inventor: Andrew B. Dunwoody, Richmond, Canada

[73] Assignee: The University of British Columbia, Vancouver, Canada

[21] Appl. No.: 865,181

[22] Filed: Apr. 8, 1992

[51] Int. Cl.$^5$ .............................................. F15B 13/02
[52] U.S. Cl. ........................ 137/596.18; 137/596.15; 251/57
[58] Field of Search ...................... 137/596.15, 596.16, 137/596.18; 251/57

[56] References Cited

U.S. PATENT DOCUMENTS

| | | |
|---|---|---|
| 3,114,297 | 12/1962 | Gizeski . |
| 3,457,836 | 7/1969 | Henderson . |
| 3,746,041 | 7/1973 | Friedland . |
| 3,834,419 | 9/1974 | Bozoyan . |
| 4,391,092 | 7/1983 | Arnett . |
| 4,503,888 | 3/1985 | Brovold . |
| 4,768,544 | 9/1988 | Beam et al. . |
| 4,813,339 | 3/1989 | Uno et al. . |

OTHER PUBLICATIONS

Fluid Power Handbook & Directory, 1990–1991, A/9-4-A/707.

Primary Examiner—Gerald A. Michalsky
Attorney, Agent, or Firm—C. A. Rowley

[57] ABSTRACT

A digitally controlled valve system is composed of the main fluid control valve with a displaceable flow control portion (spool) that is controllably displaced by a digital pressure generator that generates digitally incremented pressure changes which operate against a biassing pressure or spring to displace the spool in a direct relationship to the pressure provided by the pressure generator. In one version, a main valve directs flow to either a high or a low pressure-control valve each of which is biassed toward a closed position by a pressure substantially equivalent to the pressure drop of flow of fluid through the main valve which pressure closes the valve stop flow when the pressure drop is too high (i.e. flow through the main valve is throttled). The flows through the valves are selectively adjusted via the digitally-generated pressure from the digital pressure generator. In another version of the invention the two pressure control valves are replaced by a two direction control valve that directs flow to or from the main valve which is connected to an output line. The flow rate is dependent on the spool displacement of the main valve. The position of the spool of the two direction control valve in the later version is adjusted based on the pressure drop across the main valve. Properly sizing of the flow passage orifices (and biassing pressure i.e. springs) in the main valve provides a valve system where the flow varies directly with the amount of pressure applied to displace the spool of the main valve.

18 Claims, 4 Drawing Sheets

DIGITAL HYDRAULIC VALVE CONTROL

FIELD OF THE INVENTION

The present invention relates to a digital hydraulic control valve. More particularly the present invention relates to a system for digitally incrementally applying a force or pressure, to displace a displaceable portion of a main control valve and thereby vary the flow through the system in direct proportion to the pressure applied.

BACKGROUND OF THE INVENTION

Many hydraulic devices such as proportional control valves require pilot stage or hydraulic amplifiers between the input or electric signal and the hydraulic fluid being controlled. The electric signal cannot directly generate sufficient force to move the valve components of the hydraulic device rapidly in response to the changes of signal input. Generally the electric input signal is directed to a solenoid or torque motor which is used to shift a pilot spool, flap or valve jet nozzle or similar device, a number of which are described in Fluid Power Handbook and Directory, 1990-91 A/9-4-A/107. The hydraulic fluid controlled in this manner is used to shift the spool of the main valve or some other component in the main valve which controls the main fluid flow to the device being controlled, i.e. the main valve controls the flow of a significantly higher amount of fluid at a significantly higher pressure than that used for example in a hydraulic pilot valve.

Typically the pressure in the hydraulic pilot valve are an order of magnitude smaller than the pressure in the main hydraulic circuit. Further, the passage sizes within the hydraulic pilot are small rendering the pilots sensitive to contaminants within the fluid and requiring, in some cases, special filtering of the hydraulic fluid. It is also important that the tolerances to which the hydraulic pilot is machined be relatively precise thereby increasing the cost.

It is has also been proposed to use a controlled pulse-width-modulation system, i.e. one in which a pilot signal controls a pair of fast on/off solenoid valves which apply depending on which one of the valves is actuated, a supply pressure and then a tank pressure to the hydraulic pilot circuit. The fraction of the time in each of these cycles when the circuit is connect to the supply versus the time it is connected to the tank pressure, determines the pressure within the pilot circuit (see for example U.S. Pat. No. 4,813,339 issued Mar. 21, 1989 to Hitachi Limited). This type of valve will overcome some of the problems in the conventional pilot but the response to this is relatively slow so that this system is probably only applicable for proportional control and not for a more demanding application such as closed looped servo control.

Examples of different electro hydraulic control systems are disclosed for example in U.S. Pat. Nos. 3,457,836 issued Jul. 29, 1969 to Henderson which employs a hydraulic motor in order to shift a spool; and 3,746,014 discloses a specific annular arrangement of a plurality of different pressure chambers utilized to control hydraulic flow.

The Gizeski U.S. Pat. No. 3,114,297 issued Dec. 17, 1962 discloses a system wherein a plurality of discrete interconnected pistons are used to move the main piston and thereby apply a selected pressure to a pressure control valve.

U.S. Pat. No. 4,768,544 issued Sep. 6, 1988 to Beam et al discloses a digital valve unit formed by a plurality of orifices sized in a binary relationship so that by selecting the proper combination or orifice sizes the desired flow can be obtained.

U.S. Pat. No. 4,391,092 issued Jul. 5, 1983 to Arnett describes a system similar to that described above with respect to U.S. Pat. No. 4,768,544 and utilizes the system to control the plurality of bleed air valves of the gas turbine engine.

U.S. Pat. No. 3,834,419 issued Sep. 10, 1974 to Bozoyan discloses a system of levers to digitally adjust the volume of hydraulic fluid in a bellows which is used to digitally adjust the position of a hydraulic control valve.

U.S. Pat. No. 4,503,888 issued Mar. 12, 1985 to Brovold uses digital rotary inputs from a stepper motor to digitally move a spool of a control valve.

Brief Description of the Present Invention

It is an object of the present invention to provide a digital hydraulic pilot control system to accurately control the displacement of a displaceable element of a main hydraulic control valve.

It is a further object of the present invention to use the pilot pressure developed to control flow direction as well as flow rate.

Broadly the present invention relates to a digital control valve system comprising a main fluid control valve having a displaceable portion that regulates the size of an orifice controlling flow through said main valve, a digital pressure generator means having a plurality of different area piston and cylinder systems and mean to selectively connect each of said piston and cylinder systems with a first source of fluid at a first pressure or a second source of fluid at a second pressure different from said first pressure or force and provide an out put pressure or force in accordance with the sum of the forces applied by said piston and cylinder systems to generate said output pressure, means apply to apply said output pressure to said displaceable portion to controllably displace said displaceable portion.

Broadly the present invention relates to a digital control valve system comprising a main fluid control valve having a displaceable portion that regulates the size of an orifice controlling flow through said main valve, a digital pressure generator means to generate an output pressure, means apply said output pressure to said displaceable portion to controllably displace said displaceable portion, a first control valve, means to direct fluid from a main pressure source to main valve and from said main valve to said first valve, first biasing means for biasing said first valve toward a closed position based on the pressure drop of fluid flowing from said pressure source through said main valve to said first valve and means for applying an opening pressure based on the pressure positioning said displaceable portion of said main valve to act on said first valve in concert with a second biasing means to controllably open said first valve and permit flow from said main valve through said first valve to an output line when the displaceable member of said main valve is in a position to permit flow to said first valve.

Preferably said main valve is a spool valve and wherein said displaceable portion comprises a spool of said spool valve.

Preferably said first biasing means bias will comprise a piston means connected to a moveable portion of said first valve, means for applying said main source pressure on one side of said piston means and means for applying fluid from said main source passing from said main valve to said first valve to the opposite side of said piston to which said source pressure is applied, said main source pressure on said one side urging the first valve toward closed position.

Preferably passages formed in said main valve define an orifice means which on the movement of said displaceable portion (spool) will vary in area in proportion to the square root of the displacement of the spool from a neutral position which distance is dependent upon the difference in pressures applied to opposite ends of said spool.

Preferably said system will further comprise a second control valve substantially the same as said first valve, means for directing flow from said output line through said main valve to said second valve when said displaceable portion of main valve is in a return flow position, means biasing said second valve to a closed position by a pressure equivalent to the pressure drop in the fluid flowing from said output line through said main valve to said second valve, further means for applying a pressure based on said output pressure positioning said displaceable portion of said main valve to said second valve to selectively open said second valve when said output pressure positions said displaceable portion of said main valve to permit flow therethrough from said output line to said second valve.

The present invention also relates to a hydraulic system comprising a source of fluid under pressure, a receiver and an output line, a main valve connected in series with a two direction control valve to control flow between said output line and said source or between said output line and said receiver, each of said main and said two direction control valves having a displaceable portion, a digital pressure generating means, valve means for selectively connecting said digital pressure generating means to said main and said two direction control valves to apply pressure on said displaceable portions of said main and said two direction control valves to position said displaceable portions to selectively connect said output line with said source or to said receiver and said digital pressure generating means adjusting the position of said main and said two direction control valves to control the rate of fluid flow through said main and said two direction control valves to and from said output line.

Preferably said valve means will direct fluid from a second source to react against said displaceable portions of said main and said second main valves in opposition to said digital pressure generating means.

In one embodiment said second source will be at a higher pressure than that generated by said digital pressure generator means e.g. said first and second sources may be the same source and in another embodiment said second source will be at lower pressure than that generated by said digital pressure generating means.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
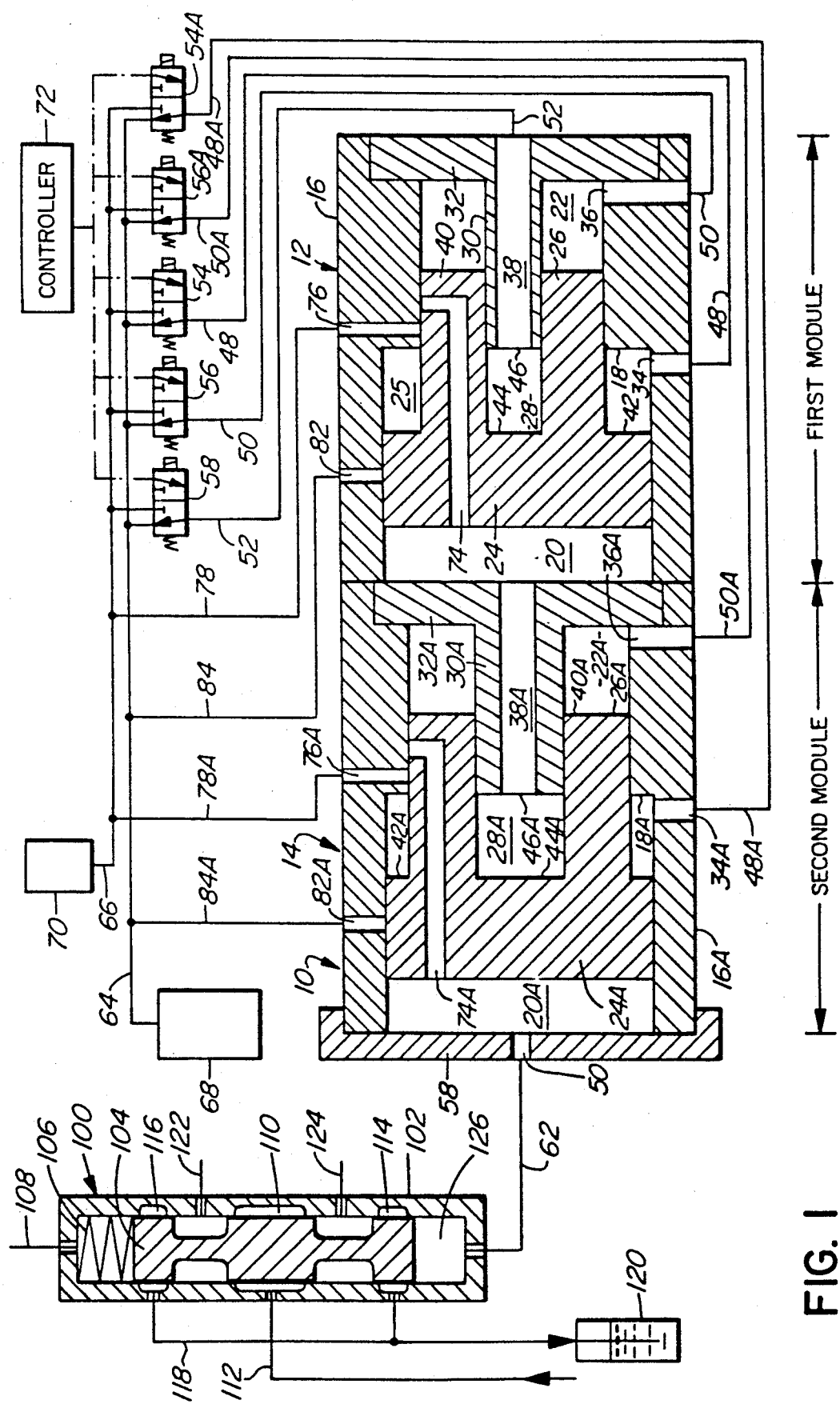
FIG. 1 is a schematic illustration of a control system using a specific type of modular digital pressure controller to adjust the position of a spool valve.

As shown in FIG. 1, the present invention is composed basically of a hydraulic pressure controller 10 operating a valve, in this case a spool valve 100.

The particular pressure controller illustrated is the subject of applicant's U.S. patent application Ser. No. 07/756,332 filed Sep. 6, 1991 inventor Dunwoody.

Other suitable actuators may be used including but not limited to the pressure generator as described. For example in U.S. Pat. Nos. 5,011,180; 5,058,384 and 5,062,268 issued Apr. 30, 1991: Oct. 22, 1991 and Nov. 5, 1991 respectively to Dunwoody or 4,602,481 issued Jul. 29, 1986 to Robinson or German patent 3836103A1 to Dailmer. The preferred actuators will be hydraulic actuators that develop pressure in a hydraulic fluid rather than use the mechanical linkages to apply the pressure as required as illustrated in the U.S. application Ser. No. 07/585,524, now U.S. Pat. No. 5,062,268, or in the preferred arrangement described in U.S. application Ser. No. 07/756,332. The digital pressure generator 10 as illustrated in FIG. 1 is essentially the same as that described in U.S. application Ser. No. 07/756,332 which is incorporated herein by reference. For completeness the pressure generator 10 will now be described with reference to FIG. 1.

As shown FIG. 1 digital pressure generator 10 is formed by a pair of modules 12 and 14 each of which is similarly constructed but may have piston of different cross sectional areas thus the description of module 12 will also be applicable to module 14 and like reference numerals have been used to indicate like parts of the two modules, but with the corresponding parts in the second module 14 followed by the letter A.

Each module is formed by housings 16 and where the modules are to be assembled in end to end relation it is preferable to make the outside cross section of the housing 16 of each of the modules substantially the same.

The housings 16 are divided at a line of demarkation 18 into a first cylinder forming section or cavity 20 and a second cylinder forming section or cavity 22. A piston 24 is received in the larger cylinder section 20 to form a large area piston on one side thereof and a smaller area piston on the opposite side thereof received in the cavity 25 and is provided on the opposite side thereof with an extension 26 that forms a piston within the second cylinder section 22. The piston 24 and extension 26 are integrally interconnected so that movement of one causes movement of the other.

The extension 26 has a cavity 28 that extends substantially axially thereof and receives a shaft forming piston 30 which is connected to an end closure 32 that closes the end of the housing 16 and thus the end of the small cylinder forming section 22 remote from the larger cylinder forming section 20.

A first hydraulic flow passage 34 extends through the housing 16 into the section 20 adjacent to the line of demarcation 18 between the cavities 20 and 22, a second hydraulic passage 36 extends through the housing 16 and enters the section 22 at a position adjacent to the end closure 32 and an axial passage 38 extends through the shaft forming piston 30 and end closure 32 into the cavity It will be apparent that the passage 36 permits the ingress and egress of hydraulic fluid into a cylinder on the outside of the piston 30 and between the end closure 32 and the end wall 40 of the extension 26. The passage 34 on the other hand communicates with cylinder formed outside of the extension 26 and permits the development of a hydraulic pressure between the line of demarcation or area of demarcation 18 and the corresponding surface 42 on the first piston 24, i.e. the portion of the piston 24 extended beyond the extension 26. The passage 38 permits communication with the cavity 28 and thus adjusts the pressure between the wall 44 of the piston 24 and the end 46 of the piston 30.

Each of the passages 34, 36 and 38 are connected via line hydraulic 48, 50 and 52 to their respective control valve 54, 56 and 58 respectively. However the passage 38A in the second module 14 does not have a corresponding line to line 52 since the passage 38A connects directly with the cylinder 20 and transmits the hydraulic pressure within the cylinder 20 into the cavity 28A to thereby couple the two modules together.

The end of the second module 14 remote from the first module 12 is covered via a cap 58 having a fitting 60 through which hydraulic fluid from the chamber 20A may be withdrawn and directed as indicated by the arrow 62 to actuate any selected hydraulic mechanism.

In the above description only two modules 12 and 14 have been illustrated, however the cap 58 may be removed and further module(s) similar to the module 14 or 12 may be applied in place of the cap 58 and the cap 58 is applied to the final module assembly in the same manner as illustrated to the modules 14.

Each of the valves 54, 56 and 58 are connected via lines 64 and 66 selectively to a source of hydraulic fluid at low pressure, i.e. a reservoir 68 or to a higher pressure source 70 respectively. Each of the valves 54, 56 and 58 are controlled by a controller 72 so that cylinder sections 20, 22, and 28 can be selectively, individually connected either to the high pressure source 70 or to the low pressure source 68 via the controller 72.

Preferably the areas of the pistons sections 40, 42 and 44 will be different and will be in a selected sequence. In the illustrated arrangement the area 44 has been indicated as having an area of 1, the area 42 having an area of 2 which is twice 1 and the area 40 having an area of 4 which is twice the area 2.

In the illustrated arrangement the area 44A has been designated as area 1, the area 42A is equivalent to the area 44A and the area 40A is twice the area 44A or 42A.

Provision has been made should the pistons 24 or 24A be over extended in one direction or the other. In the event say the piston 24 extends too far to the left in FIG. 1 then the passage 74 will connect with the passage 76 which is connected via line 78 to connect the high pressure 70 to the cavity 20 to apply high pressure on the full surface area of the piston 24 and force same to the right. Alternatively if the piston 24 moves too far to the right the passage 82 communicates with the section 22 to the left of the piston 24 so that the cavity 20 may be connected via line 84 to the low pressure source 68.

The spool valve 100 to which the output line 62 from the pressure generator 10 is connected in FIG. 1 comprises a cylinder 102 having a spool 104 which in the illustrated arrangement is biased downward via a spring as indicated at 106 or a suitable hydraulic force or pneumatic force as indicated at 108 or a combination of the two.

The cylinder has annular passages 110 connected to a hydraulic pressure source as indicated by line 112 and annular passages 114 and 116 each of which are connected via line 118 to a reservoir 120.

The spool 104 is shifted axially by the biasing pressure applied via line 62 to connect one of the lines 122 or 124 either to the pressure source via passage 110 or to the return line 118 via passages 114 and 116, i.e. if the spool 104 is shifted downward in FIG. 1, the line 112 will be connected to the positive source 112 and the line 124 will be connected to the annular passage 114 and thereby to the line 118 in the reservoir 120. The opposite happens if the spool is shifted upwardly in which case the line 124 is connected to 112 and 122 is connected via the annular passage 116 to line 118.

The operation of this device will be apparent. When the pressure in chamber 126 by fluid flow from the pressure generator 10 via line 62 is increased beyond a datum or neutral point i.e. pressure in chamber 126 exceeds the biasing pressure applied as indicated at 106 and/or 108 the pressure in the chamber 126 moves the spool 104 upwardly. If the pressure from the pressure generator 10 is reduced to less than the pressure applied at the upper end of the spool 104 the spool will move downward. Pressure applied via chamber 126 can be varied in finite increments by selectively operating via computer 72 the control valves 54A, 56A, 54, 56, 58 etc. between the high and low pressure sources 70 and 68 respectively so that the actual pressure in the chamber 126 is precisely controlled.

Clearly the amount of pressure that may be applied in the chamber 126 is relatively high and thus the biasing force applied to the opposite end of the spool 104 may be relatively high and the displacement of the valve spool 104 more accurately controlled.

The valve 100 may be used as a simple direction control valve i.e. to selectively connect the lines 122 and 124 to source 112 and receiver 120 and vice versa, but preferably the spring 106 and/or pressure applicator 108 will adjust the pressure or force on the spool in proportion to the displacement of the spool 104 from its datum or neutral position where the lines 122 and 124 are not connected to the lines 112 or 118. For example the when the spool 104 is moved the displacement of the spool may be used to adjust the rate of flow through the valve 100 i.e. the displacement of the spool 104 will be dependent on the pressure applied by the actuator 10 which requires that the biasing pressure for example applied by the spring 106 change with displacement of the spool 104 so that a specific displacement of the spool 104 correspond with a specific biasing pressure and a corresponding pressure generated by the actuator 10. The size or effective area of the communication passage(s) through the valve 100 change in an appropriate manner depending on the degree of displacement of the spool 104 from its neutral position.

Figure 2:
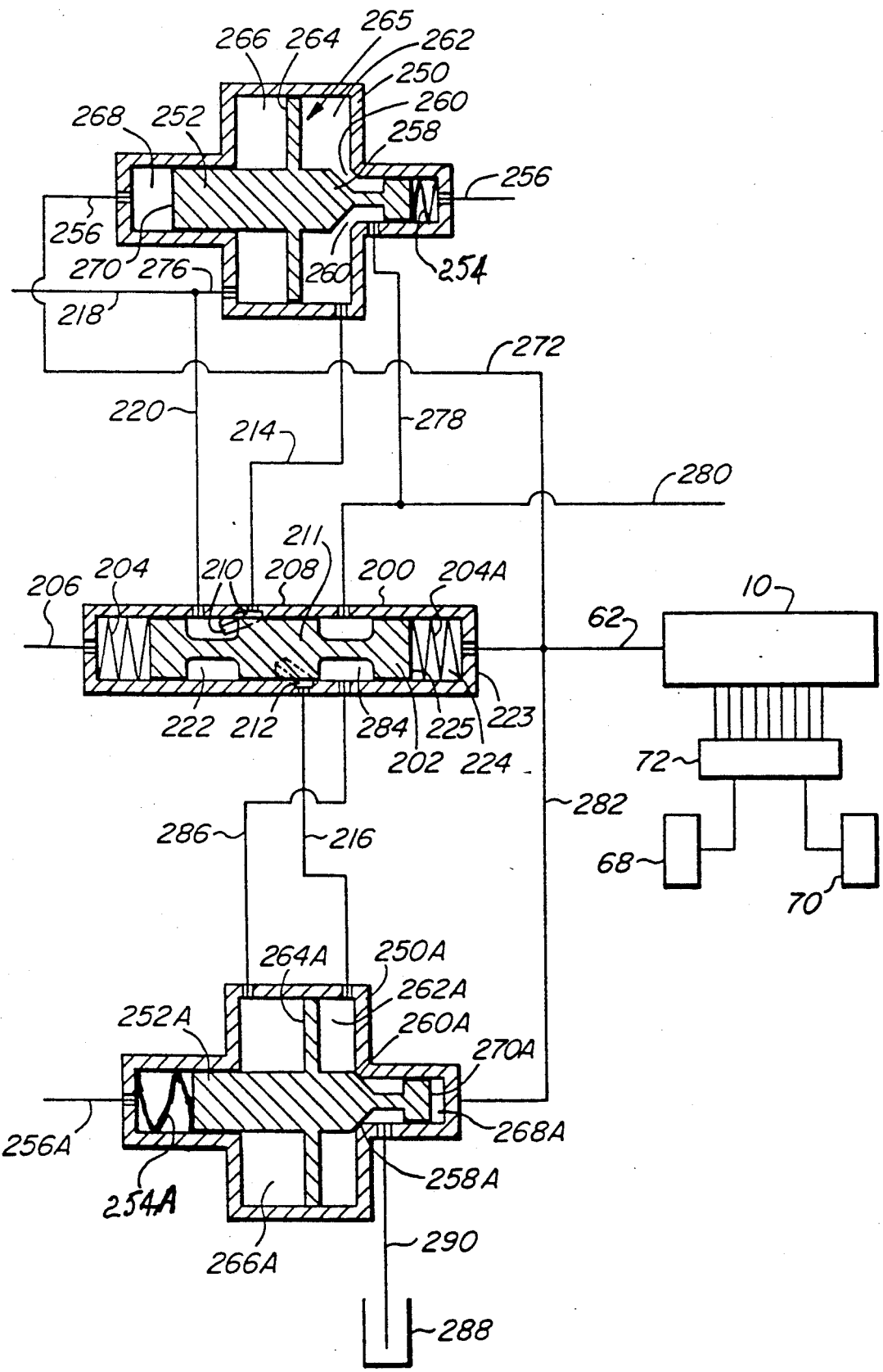
FIG. 2 is a schematic illustration of specific application of a spool valves constructed in accordance with the present invention applied to control flow from a pressure source to an operating element and from the operating element to a reservoir.

FIG. 2 shows another embodiment of the present invention wherein the main control valve 200 is specifically constructed as will be described below to have an effective passage area formed in the valve 200 that varies in direct relationship to the square root of the pressure applied to displace the spool 202 as will be described below. This valve 200 has a spool 202 one end of which is acted upon by pressure from the digital pressure generator 10 equivalent to the pressure generator 10 described hereinabove to move the spool 202 in one direction (to the left in FIG. 2) while a spring 204 or variable hydraulic or pneumatic pressure means 206 acts to bias the valve spool 202 in the opposite direction (i.e. to the right in FIG. 2).

The valve body 208 is provided with a pair of communicating passages formed by grooves 210 and 212 which are connected to output lines 214 and 216 respectively. The lengths of the groove 210 or 212 exposed to the chambers 222 and 284 formed by the spool 202 are dependent on the position of the spool 202 specifically of the central land section 211 of the spool 202.

In the illustrated arrangement fluid from a source of hydraulic fluid under pressure is introduced as indicated via line 218 and passes via line 220 into the chamber 222 the valve 200. Depending on the position of the spool 202 flow passes from the chamber 222 via the groove or passage 210 to line 214. The line 214 has been schematically illustrated as connecting to one end of the groove 210, however the interconnection between the line 214 and groove 210 will insure that the area of the groove 210 exposed in the chamber 222 will be the factor governing the flow as opposed to the cross sectional area of the groove 210.

The shape of the groove or passage 210 which is machined into the body 208 of the valve is such that the available area opening into the chamber 222 varies directly with the square root of the spool movement which is directly dependent on the pressure from the pressure generator 10, i.e. the hydraulic pressure within the hydraulic chamber 224 formed between the end 223 of the housing 208 and the adjacent end or right hand end 225 of the spool 202. It has been found that a simple straight groove at an angle of approx. 45 degrees to a plane perpendicular to the axis of the spool 202 changes in exposed area in accordance with square root of the pressure so that the flow through the valve 200 in the arrangement shown in FIG. 2 varies with the pressure in chamber 224 as will be described hereinbelow. The groove 212 is constructed substantially the same as the groove (a mirror image) and varies the size of the passage through the valve 200 from the chamber 284 and line 216 in the same manner as the groove 210 varies the flow between the chamber 222 and the line 214. Additional grooves (not shown), similar to 210 and 212, may also be formed in the housing 208 but angularly displaced from 210 and 212. Symmetrical placement of the multiple grooves around the housing 208 better ensures that no net radial load is placed on the spool 202. An unbalanced radial load would induce additional friction between the spool and the housing which might inhibit proper axial positioning of the spool.

The first or high pressure control valve 250 has a piston 252 biased to the left in FIG. 2 via a spring 254 and/or hydraulic or pneumatic pressure introduced at 256. The piston 252 has a seat 258 which mates with a corresponding seat or edge 260 in the housing of the valve 250 to close off flow from an outlet chamber portion 262 formed on one side of a dividing partition 264.

The dividing partition 264 is connected to and forms part of the piston 252 and divides the chamber 265 into the outlet chamber portion 262 referred to above and a source pressure chamber portion 266. The cross sectional areas of the partition 264 exposed to the chamber portions 262 and 266 are essentially the same so that any biasing pressure applied by the partition 264 to the piston 252 is equivalent to the difference in pressure in the chamber portions 262 and 266.

A control pressure chamber 268 acts on the end 270 of the piston 252 remote from the spring 254 to control movement of the piston 252. This chamber 268 is supplied with pressurizing fluid via line 272 which receives fluid under pressure from the line 62 leading from the pressure generator 10 to the chamber 224 so the chamber 224 and 268 are at substantially the same pressure.

The source pressure chamber portion 266 is connected to the source pressure line 218 via line 276 while the line 214 from the main valve 200 is connected to the chamber portion 262 so that the pressure on one side (chamber 266) of the divider 264 is line or source pressure and the pressure on the opposite side (chamber 262) is source pressure less the pressure drop across the valve 200, i.e. the pressure drop along the line 220 into chamber 222 out via slot 210 and line 214 to chamber 262 so that there is greater pressure or force equivalent to the pressure drop across the valve 200 urging the piston 252 to a seated (closed) position than to open position. The biasing pressure as applied via the biasing means 254 and/or 256 urges the piston 252 in the direction to open the valve 250 and permit flow from the chamber portion 262. When the valve formed by the seats 258 and 260 is in an open position the pressure from pressure generator 10 is sufficiently low that the piston 252 moves to open the valve 258, i.e. the sum of the pressure (forces) tending to move the valve 250 to closed position (source pressure in chambers 266 and 268) must be less than the pressure tending to open the valve 250 (pressures in chamber 262 plus biasing pressure 254 or 256). When the valve 250 is open the chamber 262 is connected to the output line 278 which in turn is connected to the element to be driven as indicated via line 280.

It will be apparent that the valve system illustrated in FIG. 2 requires a datum pressure be applied to hold the valve spool 202 in neutral position wherein there is essentially no flow through the valve 200 to the valve 250 (or 250A as will be described below). This datum pressure will be coordinated with the biasing pressure on the spool 202 applied at 204 and/or 206 and those applied to the valve 250 (254/256) and 250A (254A/256A) to obtain the required opening and closing of these valves. When the datum pressure is applied all of the valves 200, 250 and 250A are in closed position.

In the illustrated arrangement when the pressure from the pressure generator 10 is increased above the datum pressure which holds the moveable portion or spool 202 in neutral position, the valve spool 202 is shifted to the left in FIG. 2 (the valve 250 is closed) and the valve 250A is opened by shifting the piston 252A to the left in FIG. 2 via pressure from the pressure generator 10 being applied to the chamber 268A via line 282. The valve 250A is essentially the same as the valve 250 and corresponding parts have been indicated by the same reference numeral but followed by the letter A when referring to the valve 250A. The fluid from output line 280 passes through the chamber 284 of the valve 200 and via line 286 to the pressure chamber 266A to bias the piston 252A to the right. The force applied via the pressure in chamber 266A to the piston 252A is resisted by the pressure applied in the chamber 262A which is lower than the pressure in the chamber 266A by the pressure drop through the valve 200A i.e. from chamber 284 through groove 212 and line 216 to chamber 262A. The exposed area of the groove 212 varies as the square root of the pressure in the same manner as the area of the groove 210 varies to control the flow to line 216 as described above.

When the pressure applied in chamber 268A is sufficient to open the valve 250A (i.e. to overcome the biasing pressure 254A and/or 256A plus the pressure drop through the valve 200) flow can occur from the line 280 through the valve 200 and 250A to the reservoir or the like 288 via the line 290.

The above arrangement assures positive cut off of flow when the datum pressure is reached by closing the valves 250 or 250A (depending on the change in pressure to approach the datum) which ensures a positive stop in flow without requiring extremely accurate machining of the main valve 200 i.e. the machine tolerances may be relaxed to reduce the cost of the valve.

The two pressure valves 250 and 250A function as follows. The pressure difference across the appropriate groove 210 or 212 respectively of the main variable orifice valve 200 is applied to opposite sides of the partitions 264 or 264A so that any pressure difference across the main valve 200 is translated into a force acting on the respective piston or pressure control valve spool 252 or 252A. The chambers 268 and 268A which apply hydraulic pressure to the pistons 252 and 252A are connected to the digital pressure generator 10 to apply pressure from the pressure generator to bias the pistons 252 and 252A in a particular direction which pressures are opposed by the biasing pressures applied from line 256 or 256A and/or springs 254 or 254A. The pressure drops across the valve 200 define forces tending to hold the valves 250 and 250A in closed position.

The position of the spool 202 of valve 200 is defined by the applied pressure from the pressure generator 10 ie the difference in pressure in chamber 224 and the biasing force applied at 204 and/or 206 and the size of the orifice formed by the grooves 210 or 212 changes depending on the position of the spool 202. Any change in size of the orifice formed by the grooves 210 or 212 changes the pressure drop across the valve 200 and force tending to hold the valves 250 or 250A closed. It will be apparent that if the flow through the valve 200 is throttled the pressure opposing the closing of the valve 250 or 250A becomes small and the total pressure in the chamber 266 or 266A forces the valve 250 or 250A to closed position.

The effective orifice area (210 or 212) of the main valve 200 varies in proportion with the square root of the pressure difference at opposite ends of the spool 202 as this defines the displacement of the spool and the orifices are configured to change in area on displacement of the spool 202 based on the square root of the pressure.

The basic equation for flow through an orifice is given by the equation $$q = C_d A \sqrt{2\delta p/\rho} \quad (1)$$

where $C_d$ = discharge coefficient of the orifice (essentially a constant)

A = area of the orifice $\delta p$ = pressure difference across the orifice $\rho$ = density of the fluid.

The area of the orifice 210 or 212 is proportional to the square root of the pressure difference between that generated by 10 and the datum value applied to 204 or 206 or both.

$$A = K_a \sqrt{\Delta p} \quad (2)$$

where $K_a$ = a constant of proportionality dependent on the geometry of the slot, the diameter of the spool and the stiffness of the spring 204.

$\Delta p$ = the pressure difference between that generated by 10 and the datum pressure.

The valves 250 and 250A are arranged such that the pressure drop across the orifice area 210 or 212 is controlled to be proportional to the difference in pressure between that generated by 10 and the datum pressure.

$$\delta p = K_p \Delta p \quad (3)$$

where $K_p$ = a constant of proportionality dependent on the face areas in valves 250 and 250A.

The cooperative action of the valves 200, 250 and 250A is such that the flow rate is proportional to the difference in pressure between that generated by 10 and the datum pressure.

$$q = C_d K_a \Delta p \sqrt{2K_p/\rho}$$

Thus it is apparent that if the orifice area (210 or 212) is proportional to the square root of the pressure difference at opposite ends of the spool 202 and the pressure drop across the orifice is also proportional to this pressure difference, then the flow rate is proportional to the pilot pressure difference.

Figure 3:
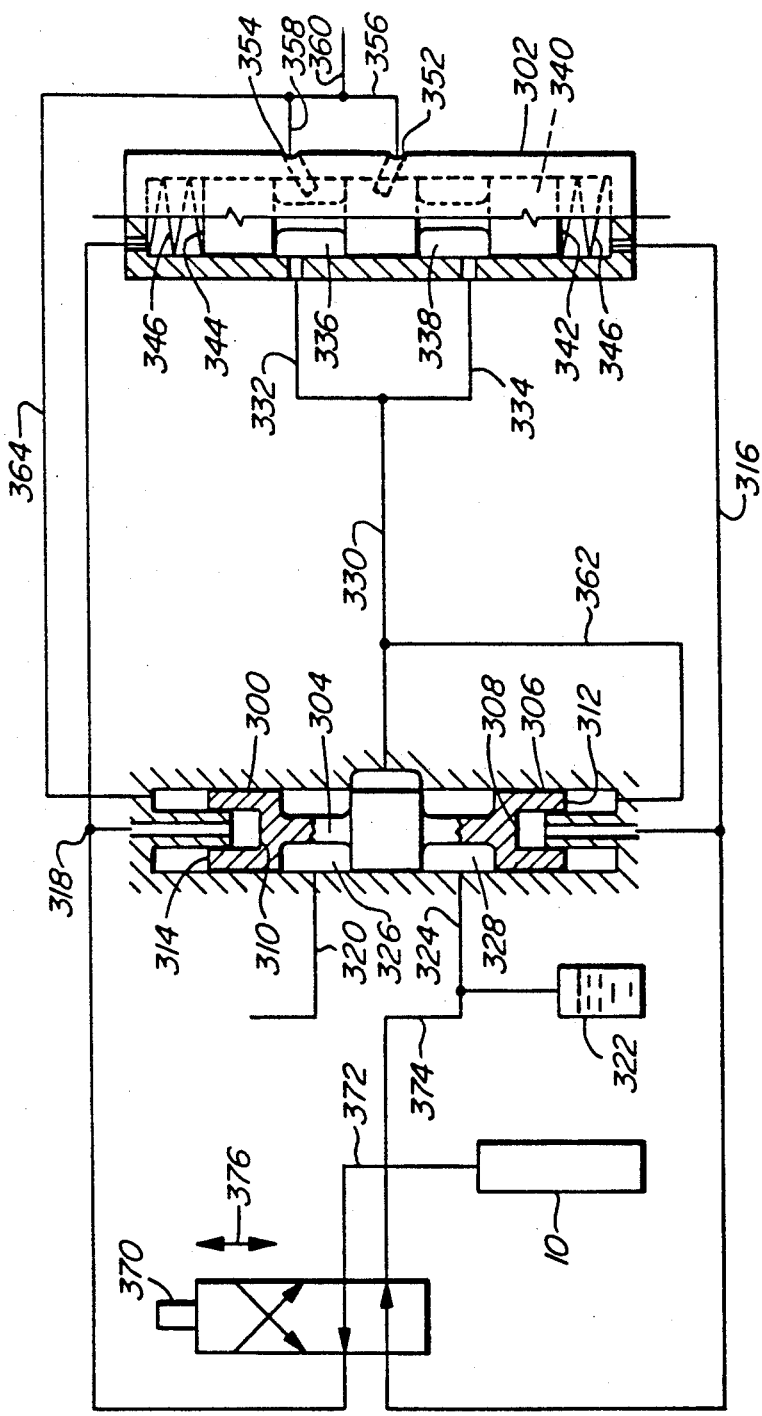
FIG.3 is an illustration similar to FIG. 2 showing a preferred alternative arrangement.

The system shown in FIG. 3 employs only two valves, in this case a two direction control valve 300 and a main valve 302. The valve 300 is composed of a spool 304 moveable in a casing 306 and defining a first piston area 308 at one end and a corresponding piston chamber or area 310 at the opposite end of the spool 304. A second pair of piston areas 312 and 314, which in this case are concentric with and surround the piston chambers or areas 308 and 310 respectively are also positioned one at each end of the spool 304. The piston areas 308 and 310 are connected to pilot pressure lines 316 and 318 respectively which are used to apply pressure to axially displace the displaceable portion or spool 304 of the valve 300.

The valve 300 is connected to a pressure source or line pressure via line 320 and to reservoir 322 via line 324, i.e. the line 320 is connected to groove or cavity 326 and the line 324 is connected to the groove or cavity 328 of the spool 304.

The flow between the valves 300 and 302 passes by a line 330 which is bisected into lines 332 and 334 communicating grooves or cavities 336 and 338 of the spool 340 of the valve 302.

The spool 340 has a first piston chamber or area 342 at one end thereof and a second piston chamber or area 344 of equivalent size to 342 at the opposite end thereof and the spool 340 is biassed to a central position by a pair of opposing springs 346 and 348. The piston chamber or area 342 is connected to pilot line 316 and the piston chamber or area 344 is connected to pilot pressure line 318.

The housing of the valve 302 is provided with a pair of grooves 354 and 352 substantially equivalent to the grooves 210 and 212 described hereinabove with respect to the FIG. 2 embodiment and these grooves are in turn connected via lines 356 and 358 to the output line 360.

The line 330 interconnecting the valves 300 and 302, i.e. on one side of the valve 302 is connected via line 362 to the piston area or chamber 312 while the output line 360 on the other side of valve 302 is connected via line 364 with the opposing chamber or piston area 314 of the spool 304 so that the pressure drop across the valve 302 provides a biasing pressure tending to position the spool 304 of valve 300.

To control the operation of the valve system of FIG. 3, a valve 370 is provided and is connected via line 372 to a digital hydraulic pressure generator 10 which is essentially the same as the pressure generator described above and to the reservoir 322 i.e. line 324 via line 374.

The valve 370 has a spool that is moveable as indicated by the arrow 376 to connect line 372 to the line 318 while the line 374 is connected to the line 316 and alternatively connect the line 372 to the line 316 when the line 374 is connected to the line 318.

Figure 4:
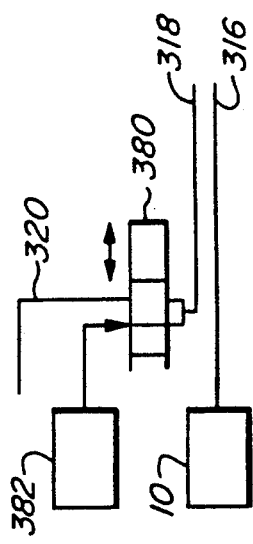
FIG. 4 is a schematic illustration of an alternative pilot pressure control arrangement that may be used with the present invention.

FIG. 4 shows an alternative system for connection equivalent to the pilot lines 316 and 318 to control the position of the spool 304 and 340. In this case the digital hydraulic actuator 10 is permanently connected to either the line 316 or 318 in the illustrated arrangement to the line 316. The line 318 is selectively connected by a valve 318 either to a source of lower pressure, i.e. a receiver 382 having a pressure lower than that generated by the generator 10 or alternatively to a source of higher pressure which in the illustrated arrangement has been indicated as the line 320 or the main hydraulic source pressure.

It will be apparent that the pressure generator 10 selectively generates pressures intermediate the source pressure in line 320 and the pressures in receivers 322 or 382.

The embodiments in FIGS. 3 and 4 operate as follows.

Assuming flow is to be from the high pressure source 320 to the output line 360 then the cavity section 326 must be positioned so that the line 320 connects with the line 330 which requires that the spool 304 be moved downward in FIG. 3. To accomplish this, assuming that the pressure in line 374 is lower than the pressure generated via the pressure generator 10, the valve 370 is adjusted to connect the line 374 with the line 316 and the digital pressure generator 10 with the line 318 so that the high pressure moves the spools 304 and 340 downward to open position connecting the cavity 326 with the line 330 and connecting the line 330 via line 332 and chamber 336 to the output passage 354, line 358 and output line 360. It will be apparent that the spool 340 is biassed downward since the pressure in line 318 is higher than the pressure from line 316.

The pressure of the fluid in line 330 is used to supplement the pressure applied from line 316 to bias the spool 304 upwardly while the output pressure, the pressure in line 316 is carried via line 364 into the chamber 314 to supplement the pressure applied from line 318 so that spool 304 is biassed upwardly by a pressure substantially equivalent to the pressure drop across the valve 302 i.e. the forces generated in 308 and 312 tend to move the spool 304 upward and are resisted by the forces applied at 310 and 314 and since in the case under discussion the pressure at 310 and 314 is the higher the spool 304 is moved down.

When flow is to be in the opposite direction the valve 370 is shifted so that the high pressure line 374 is now connected to the line 318 and the digital generator 10 is connected to the line 316. In this case the spool 304 is moved upwardly as is the spool 340 and the flow is from the line 360 through line 330, section 328 and line 324 to the reservoir 312. The pressure differential across the valve 302 is again applied to the valve 300 with the pressure in line 362 biassing the valve spool 304 upwardly being less than the pressure in line 364 connecting in chamber 314 to bias the spool 304 downward by a value again substantially equal to the pressure drop across the valve 302.

The valve arrangement shown in FIG. 3 and 4 may be applied to the embodiment shown in FIG. 1, i.e. the valve 370 (or 380) could be applied between the line 62 and say a hydraulic input line 218 and the various chambers 224, 268 and 54 and 254A and 268A to provide the required biassing pressure on opposite sides of the various spool 202, 252 and 252A.

Figure 5:
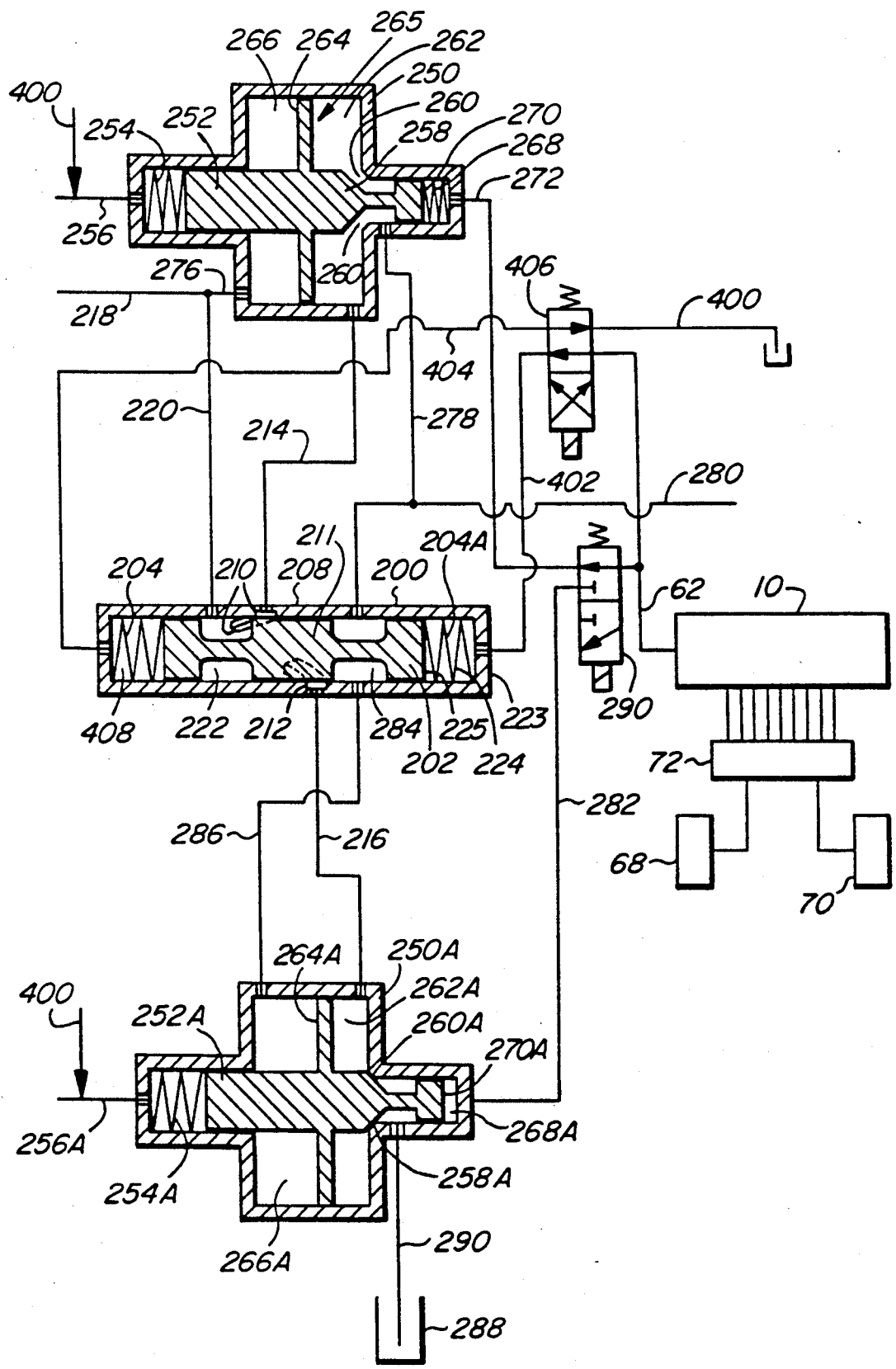
FIG. 5 is an illustration similar to the embodiment shown in FIG. 2 but incorporating direction control valveing similar to that of the system illustrated in FIG. 3 (or 4)

In the arrangement shown in FIG. 5 like parts have been numbered with similar numbers as in FIG. 2 however instead of the system requiring a specified datum point pressure to position the main spool 202 in a neutral position the spool 202 is held in a neutral position by a pair of opposing springs or the like 204 and 204A.

Separate direction control valve 290 is provided that connects the line 62 either to the line 272 or to the line 282.

It is important that valve 290 only be switchable from the line 272 to the line 282 or vice versa when the valves 250 and 250A are both closed.

The main valve 200 is connected to the digital pressure generator 10 or to a second source of pressure as indicated by line 400 through lines 402 and 404 extending from valve 406 which will be substantially equivalent to the valve 370. The line 402 connects with the adjacent cylinder or pressure chamber 224 while the line 404 communicates with the chamber 408 formed at the end of the spool 202 remote from the chamber 224.

When the valve 290 connects the actuator 10 to the line 272 (assuming the pressure in line 62 is higher than that in line 400) then the valve 406 connects the chamber 408 to the line 62 and the chamber 224 to the line 400 so that the higher pressure is in the chamber 408 moving the spool 202 to the right in FIG. 5, i.e. the chamber 224 is connected to the line 400 or the lower pressure side so that the pressure difference forcing the spool 202 to the right is based on the pressure difference between the line 62 and 400.

Alternatively the valve 290 is switched to direct pressure from the line 62 to line 282 (as can only occur when the valves 250 and 250A are in their closed position) and the valve 406 is shifted so that the chamber 224 is connected via line 402, valve 406 to line 62 and chamber 408 is connected to line 400 through line 404 and valve 406 so that now the high pressure side acts in the chamber 224 and moves the spool 202 to the left.

Equations 1, 2, 3 and 4 also apply to the embodiments shown in FIGS. 3 and 5 so that the flow through the valve system of these embodiments also vary directly with the pressure differential across the spools.

Having described the invention modifications will be evident to those skilled in the art without departing from the spirit of the invention as defined in the appended claims.

I claim:

1. A control valve system comprising a main fluid control valve having a displaceable portion that regulates the area of an orifice means controlling flow through said main valve, a pressure generator means for generating an output pressure, means to apply said output pressure to said displaceable portion to displace said displaceable portion in proportion to said output pressure, means to control said pressure generator means to adjust said output pressure to controllably move said displaceable portion and thereby adjust said area and thereby flow of fluid through said main valve, a first control valve and means to direct fluid from a main pressure source to said main valve, through said orifice means and from said main valve to said first valve, first biasing means for biasing said first valve toward a closed position based on the pressure drop of fluid flow from said main pressure source through said main valve to said first valve and means for applying a pressure based on said output pressure positioning said displaceable portion of said main valve to act on said first valve in concert with a second biasing means to controllably open said first valve and permit flow from said main valve through said first valve to an output line when said displaceable member of said main valve is in a position to permit flow to said first valve.

2. A valve system as defined in claim 1 wherein said first biasing means comprise a piston means connected to a moveable portion of said first valve, means for applying said main source pressure on one side of said piston means and means for applying fluid from said main source passing from said main valve to said first valve to the opposite side of said piston to which said source pressure is applied, said source side urging the first valve toward said closed position.

3. A valve system as defined in claim 2 wherein passages formed in said main valve define an orifice which on the movement of said displaceable portion will vary in area effective in proportion to the square root of the amount movement of said displaceable portion which amount is in direct proportion to the pressure difference applied to opposite ends of said moveable portion.

4. A valve system as defined in claim 2 wherein said pressure generator means comprises a digital pressure generator means.

5. A system as defined in claim 1 further comprising a second control valve substantially the same as said first valve, a connecting means connecting said output line to said second valve and means for directing flow from said output line through said main valve when said displaceable portion of main valve is in a return flow position, said second valve being biased to a closed position by a pressure equivalent to the pressure drop in the fluid flow from said connecting means through said main valve to said second valve, further means for applying a pressure based on said output pressure positioning said displaceable portion of said main valve to said second valve to selectively open said second valve when said output pressure positions said displaceable portion of said main valve to permit flow therethrough from said output line to said second valve.

6. A valve system as defined in claim 5 wherein passages formed in said main valve define an orifice which on the movement of said displaceable portion will vary in effective area in proportion to the square root of the amount movement of said displaceable portion which amount is in direct proportion to the pressure difference applied to opposite ends of said moveable portion.

7. A valve system as defined in claim 5 wherein said pressure generator means comprises a digital pressure generator means.

8. A valve system as defined in claim 1 wherein said main valve is a spool valve and wherein said displaceable portion comprises a spool of said spool valve.

9. A valve system as defined in claim 8 wherein passages formed in said main valve define an orifice which on the movement of said displaceable portion will vary in effective area in proportion to the square root of the amount movement of said displaceable portion which amount is in direct proportion to the pressure difference applied to opposite ends of said moveable portion.

10. A valve system as defined in claim 1 wherein passages formed in said main valve define an orifice which on the movement of said displaceable portion will vary in effective area in proportion to the square root of the amount movement of said displaceable portion which amount is in direct proportion to the pressure difference applied to opposite ends of said moveable portion.

11. A valve system as defined in claim 10 wherein said pressure generator means comprises a digital pressure generator means.

12. A valve system as defined in claim 1 wherein said area of said orifice permitting flow through said main valve varies in proportion with the square root of difference in pressure between said output pressure and a biasing pressure biasing said displaceable portion in the opposite direction to the direction in which said output pressure tend to move said displaceable portion and wherein said orifice means is configured to change in area on displacememt of said displaceable portion based on the square root of said difference in pressure.

13. A valve system as defined in claim 12 wherein said area A of said orifice means is defined by the formula $$A = K_a \sqrt{\Delta p} \qquad (2)$$

where $K_a$ = a constant of proportionality dependent on the geometry of said orifice means, the size of said displaceable portion and said pressure biasing said displaceable portion is said opposite direction.

$\Delta p$ = said difference in pressure between said output pressure and said pressure biasing said displaceable portion in said opposite direction.

14. A valve system as defined in claim 13 wherein said first control valve is constructed so that the pressure drop $\delta p$ across said area of said orifice means is controlled to be proportional to said difference in pressure as defined by the following equation $$, \delta p = K_p \Delta p \qquad (3)$$

where $K_p$ = a constant of propertionality dependent on the effective area in the first control valve so that the cooperative action of said main and said first control valves is such that the flow q through said valve system is proportional to said difference in pressure $$q = C_d K_a \Delta p \sqrt{2K_p/\rho}$$

where
- $C_d$ = discharge coefficient of said orifice means (essentially a constant)
- $\rho$ = density of the fluid.

15. A valve system as defined in claim 14 wherein said pressure generator means comprises a digital pressure generator means.

16. A valve system as defined in claim 13 wherein said pressure generator means comprises a digital pressure generator means.

17. A valve system as defined in claim 12 wherein said pressure generator means comprises a digital pressure generator means.

18. A valve system as defined in claim 1 wherein said pressure generator means comprises a digital pressure generator means.

* * * * *